(12) United States Patent
Walter

(10) Patent No.: US 6,640,832 B2
(45) Date of Patent: Nov. 4, 2003

(54) FUEL DELIVERY UNIT

(75) Inventor: Rüdiger Walter, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 231 days.

(21) Appl. No.: 09/875,226

(22) Filed: Jun. 6, 2001

(65) Prior Publication Data

US 2001/0050107 A1 Dec. 13, 2001

(30) Foreign Application Priority Data

Jun. 8, 2000 (DE) .......................... 100 27 991

(51) Int. Cl.$^7$ ................................. G05D 7/00
(52) U.S. Cl. .................. 137/565.01; 137/571; 210/232; 210/416.4
(58) Field of Search ............................ 137/565.01, 571, 137/315.01, 315.04; 210/232, 416.4

(56) References Cited

U.S. PATENT DOCUMENTS 6,436,287 B1 * 8/2002 Fischerkeller et al. ...... 210/232

FOREIGN PATENT DOCUMENTS

| DE | 32 25 929 C2 | 1/1994 |
|---|---|---|
| DE | 195 28 182 A1 | 2/1997 |
| DE | 196 15 081 A1 | 10/1997 |
| EP | 0 203 244 A1 | 12/1986 |
| EP | 0 297 256 A2 | 1/1989 |
| EP | 0 922 603 A1 | 6/1999 |

* cited by examiner

Primary Examiner—Kevin Lee
(74) Attorney, Agent, or Firm—Akin, Gump, Strauss, Hauer & Feld, L.L.P.

(57) ABSTRACT

A fuel delivery unit includes an installation holder accommodating at least a first reservoir with a fuel pump arranged therein, a fuel filter and a cover closure for a fitting opening in a fuel tank. The fuel delivery unit additionally includes a second reservoir which in the installation position is disposed beside the first reservoir and communicates therewith. The first and second reservoirs are accommodated by the installation holder displaceably and/or pivotably relative to each other at least between a fitting configuration and an installation configuration. At least one reservoir at least in the installation configuration is arranged at least partly outside the projected area of the cover closure in the tank.

26 Claims, 9 Drawing Sheets

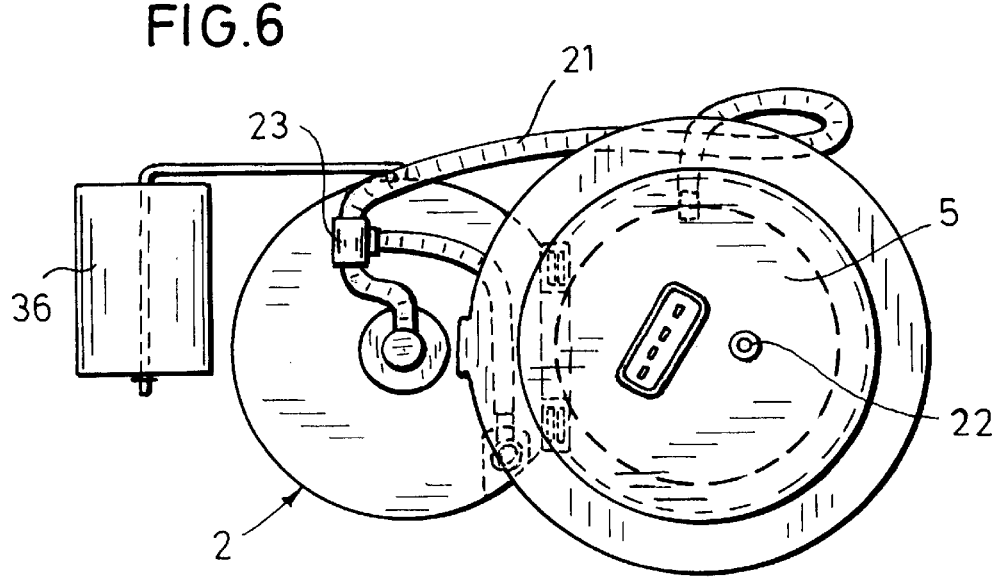
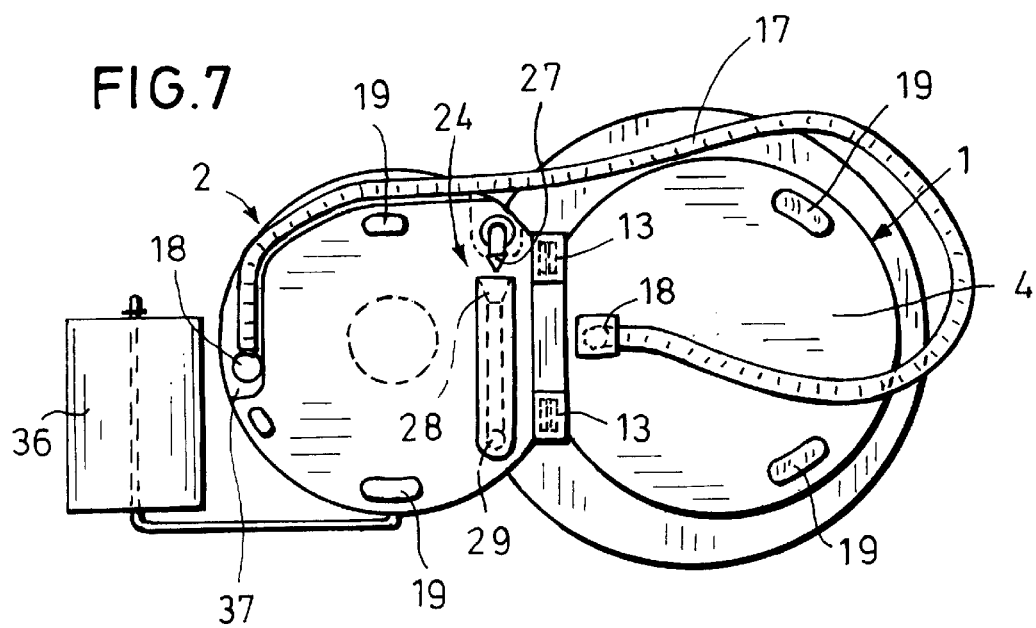

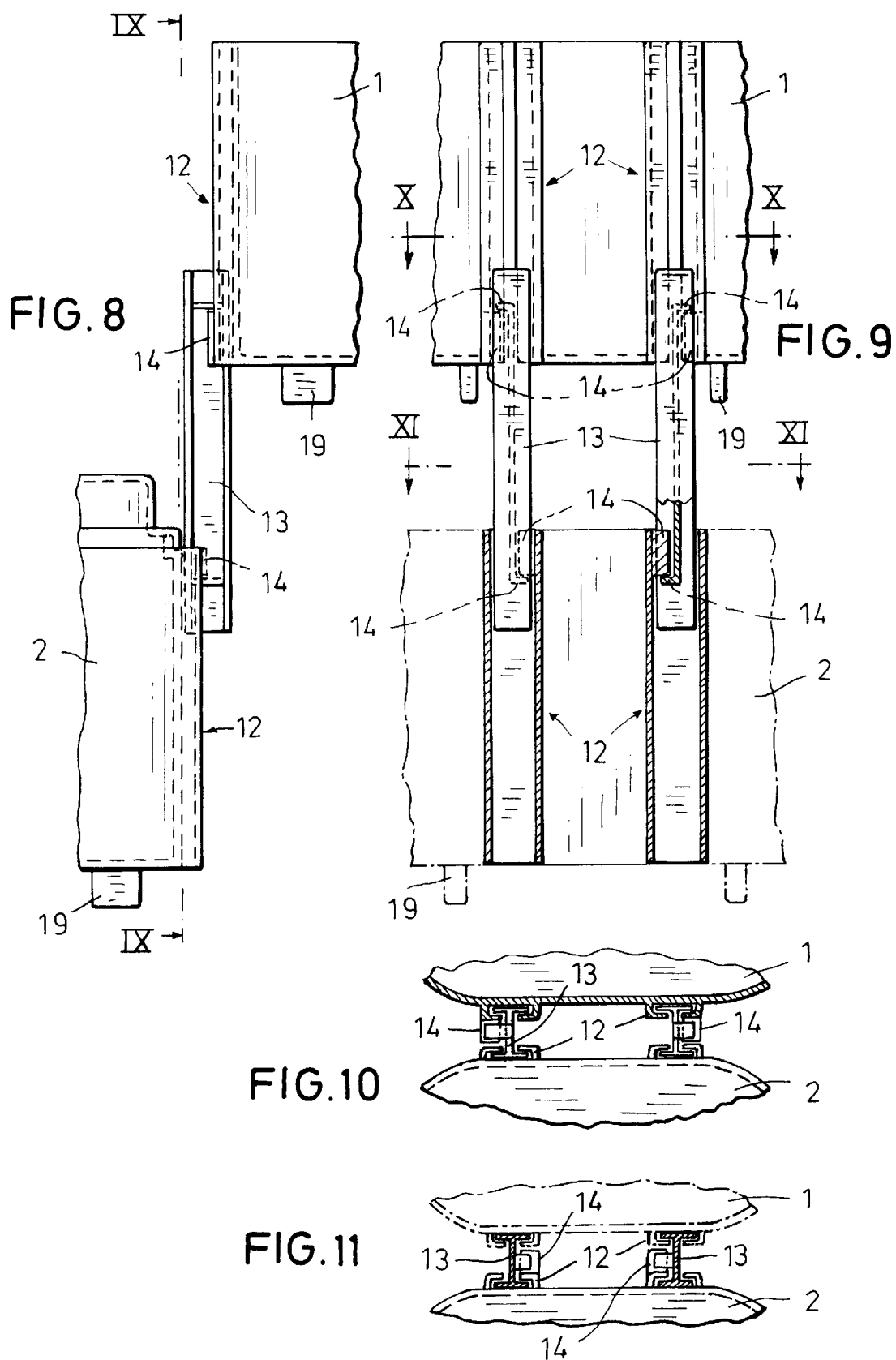

FUEL DELIVERY UNIT

BACKGROUND OF THE INVENTION

The invention concerns a fuel delivery unit, for example for supplying fuel to an internal combustion engine, such as the engine of a motor vehicle.

A typical form of a fuel delivery unit for such purposes comprises an installation holder which is operable to brace the arrangement in relation to the bottom of a fuel tank, for example by means of compression springs or flexible damping elements. It has at least one reservoir with a fuel pump disposed therein, optionally a fuel filter, and a cover closure for closing a fitting opening in the fuel tank into which the unit is fitted. Such a fuel delivery unit can be found for example in EP 0 203 244, EP 0 297 256 and for example DE 196 15 081.

Those fuel delivery units are intended to be so designed that they can be fitted and removed as a combined assembly comprising a reservoir or surge or swirl pot, a fuel pump, a fuel filter and the cover closure for the tank fitting opening, and in addition can be securely fixed on the bottom of the fuel tank. On the one hand, the aim is to ensure that the entire unit call be quickly and reliably changed in a repair or maintenance situation, while on the other hand the aim is also that such units can be adapted to any heightwise tolerances in regard to the fuel tanks used. In that respect, there have been various proposals directed at so designing the delivery unit that heightwise tolerances can be compensated by axial displaceability at least of the fuel pump, preferably the surge pot with the fuel pump disposed therein, in relation to the cover closure or a cover flange forming part of the fuel tank. For example above-mentioned EP 0 297 256 provides that the electrically powered fuel pump is designed to be axially slidable by way of a telescopic guide arrangement, with the pressure feed and return conduits, with in addition measures for supporting the fuel pump in such a way as to insulate the assembly in regard to noise.

It will be noted however that modern fuel tanks are often of such a configuration as to involve a large number of branches and other ramifications and thus afford little flat area for accommodating cover closures, cover flanges or the like, as well as also affording only limited installation volumes for fitting therein a fuel delivery unit. This means that a major demand in terms of a fuel delivery unit is for it to he as compact as possible. On the other hand however it is also necessary to ensure that the reservoir which forms part of the fuel delivery unit and which can act as a surge or swirl pot can afford an adequate volume of fuel for the fuel pump so that, even when the motor vehicle in which the tank is fitted is negotiating a bend or when the vehicle is accelerating, the engine is guaranteed a proper regular supply of fuel thereto. Finally, the volume of fuel in the reservoir often serves as a reserve of fuel. In that case, when the tank is completely emptied, the system either switches over from one or more main fuel gauges or level indicators in the fuel tank to a reserve fuel level or secondary fuel level indicator in the reservoir, in order to afford a display of maximum accuracy of the reserve amount of fuel, based on the defined volume afforded by the reservoir. The demand for the reservoir to be of the largest possible volume is however in conflict with the requirement that the fuel delivery unit is to be as compact as possible and of small dimensions so that the fitting opening for introducing the fuel delivery unit into the fuel tank in which it is to be fitted can be as small as possible. Furthermore, because of the problems in relation to sealing integrity which are related to this consideration, the fitting opening in the fuel tank should not exceed a given size.

This problem is already addressed for example in DE 32 25 929. In that arrangement the reservoir or the swirl or surge pot is made from a plurality of parts which can be secured together by a latching engagement in their position of installation on the bottom of the tank. In that case one of the parts of the swirl or surge pot forms a holder for a fuel delivery assembly which is to be subsequently inserted and which is to be installed at an angle relative to the bottom of the fuel tank in order to be able to use this arrangement even in a tank which is of relatively small structural height. However, it is not readily possible to adopt that design configuration for the reservoir in the case of a fuel delivery unit of the above-indicated kind, but rather it requires fitment of the individual parts of the reservoir and the fuel delivery assembly in a given sequence.

Reference may also be made to DE 195 28 182 disclosing a fuel delivery unit with a fuel level indicator, for installation in a fuel tank, in which a holder for accommodating a fuel delivery assembly is arranged on a tank flange in such a way as to be longitudinally slidable and rotatable. This design configuration provides that a lower end of the holder of the fuel delivery assembly can be pivotably centered on the bottom of the fuel tank or a surge or swirl pot so that an angular deviation of the flange and/or the bottom of the fuel tank from a reference position cannot have an effect on the measurement accuracy of a fuel level pick-up disposed on the fuel delivery unit. That design arrangement involves a comparatively large reservoir which accommodates the fuel pump and, with a fuel filter in a filter housing, is arranged rotatably and pivotably therewith, forming a fitting unit, by way of spring elements. Fitment of the fuel delivery unit is effected in a configuration which approximately corresponds to the installation position thereof. That arrangement of the individual parts relative to each other also requires a comparatively large fitting opening in the tank which, as already indicated above, is often undesirable.

EP 0 922 603 A1 sets forth an arrangement of two fuel reservoirs for being accommodated in a fuel tank, which are flexibly connected together at one side and at the bottom, more specifically by way of flexible bars which in a fitment configuration permit the reservoirs to assume an angled relationship with each other. The reservoir which is to be introduced first into the tank is fitted in a tilted position into the fitting opening of the tank, in such a manner that its upper end is firstly directed transversely with respect to the bottom of the tank. In order to arrange that reservoir in the installation position thereof, the first reservoir has to be turned through 90° in the tank when the second or main reservoir is being introduced into the fitting opening of the tank, in which case the main reservoir must be tilted in the fitting opening in the tank. This means that the operation of introducing that arrangement into the tank is extremely complicated and time-consuming. Ultimately, the fact that the reservoir which is to be introduced last into the tank must be tilted upon pivotal movement of the reservoir which is first inserted into the tank means that it is necessary for the internal width of the fitting opening to be selected of a correspondingly large size, which basically is something that is not wanted, as already indicated above.

BRIEF SUMMARY OF THE INVENTION

An object of the present invention is to provide a fuel delivery unit which is so designed that it always affords a sufficiently large delivery volume for a fuel pump while nonetheless being so compact that the fitting opening for same in the fuel tank can still be comparatively small.

Another object of the present invention is to provide a fuel delivery unit which affords enhanced versatility in terms of fitting it into a fuel tank to make the fitting operation easier to implement.

Still another object of the present invention is to provide a fuel delivery unit which while being of a simple structure call afford the possibility of structural re-configuring thereof for greater ease of fitting it into a motor vehicle fuel tank.

In accordance with the principles of the present invention the foregoing and other objects are attained by a fuel delivery unit with an installation holder which provides for bracing the arrangement in relation to the bottom of a tank by suitable means such as compression springs or flexible damping elements or the like and which accommodates at least one first reservoir with a fuel pump disposed therein and a closure cover for a fitting opening in the fuel tank. The fuel delivery unit also includes a second reservoir which in the installation position is disposed beside the first reservoir, the first and second reservoirs communicating with each other. The first and second reservoirs are carried by the installation holder axially displaceably and/or pivotably relative to each other at least in an installation configuration, while retaining the axial orientation thereof. At least one reservoir is arranged in the tank at least in the installation configuration at least partly outside the projected area of the cover closure.

In accordance with the present invention the reference to retaining the axial orientation is intended to mean that the basic orientation of the reservoirs in terms of the longitudinal extent thereof in the fitting configuration or upon being introduced into the tank should correspond to that of the installation position. Such a design configuration for the fuel delivery unit means that it is possible for the individual groups of the delivery unit to be moved relative to each other, that is to say pivoted or axially displaced, from a fitting configuration into an installation configuration and possibly conversely, in such a way that the fuel delivery unit in the fitting configuration takes up less space than in the installation configuration and it call be fitted through a comparatively small fitting opening in the fuel tank. In the installation position of the fuel delivery unit the components thereof can be moved relative to each other into the installation configuration so that the fuel delivery unit can be braced to or secured to the bottom of the tank in its installation configuration which takes up comparatively more space than its fitting configuration.

In accordance with a preferred feature, at least one reservoir and more preferably the first reservoir is guided longitudinally displaceably on the installation holder or on the other reservoir in such a way that the spacing thereof relative to the cover closure is variable for fitting purposes. The 'extendibility' of the overall arrangement, which is achieved thereby, means that the parts of the fuel delivery unit which are first introduced into the tank can be displaced in the tank into the installation position before the entire assembly is definitively introduced.

In a further preferred feature the second reservoir is arranged within the projected area of the cover closure.

The means for longitudinally slidably guiding a reservoir can comprise at least one and for example preferably two extendible extension portions which are slidably guided and the extension length of which can be such that the reservoir which is first introduced into the fitting opening is displaceable in the tank substantially transversely to the direction of introduction into its installation position, making use of the internal width of the fitting opening in the tank.

In an advantageous configuration of the fuel delivery unit according to the invention the above-mentioned extension portions are guide rails which are provided with end abutments and which are longitudinally slidably and non-rotatably carried on the one hand by sliding guides of the first reservoir and on the other hand by sliding guides of the second reservoir or by sliding guides of the installation holder. That means that the entire arrangement can provide for a telescoping movement thereof, wherein the end abutments on the guide rails ensure on the one hand that they cannot come completely out of the sliding guides, and on the hand they limit the possible extension length. Finally, this arrangement means that it is possible to guarantee that a reservoir is pressed against the bottom of the tank by way of the installation holder and the other reservoir in question.

In a further preferred feature of the invention the guide rails are in the form of I-profile rails and the sliding guides form C-profile grooves which embrace the flanges of the I-profile rails in positively locking relationship therewith.

In a further preferred feature of the invention the first and second reservoirs can be communicated with each other at their bottoms by way of flexible conduits on the basis of the principle of communicating vessels so as to ensure that the reservoirs are each filled to the same filling level. A fuel delivery pump or a fuel delivery assembly is disposed only in one of the reservoirs, in which case the above-described communication also ensures that the reservoirs are emptied at the same time and uniformly with each other.

It would however also be possible to provide a respective fuel delivery assembly in each of the reservoirs. Both of those assemblies can supply fuel to the engine, or one of them could supply fuel to the respective other reservoir.

In accordance with another preferred feature of the invention the communicating conduit for the reservoirs is arranged to extend substantially below same, more specifically in such a way that, when the reservoirs are in the condition of being moved away from each other, that is to say they are in the fitting configuration thereof, the communicating conduit projects scarcely or not at all out of the projected area of the reservoirs. In that way it is possible for the diameter of the fitting opening in the tank to be only immaterially larger than the diameter of the reservoirs, thereby ensuring that the fitting operation can proceed without major problems.

A preferred feature of the invention provides that the position of the connections of the reservoirs to the communicating conduit relative to each other is so selected that, when the tank assumes an inclined position, a discharge flow of fuel from that reservoir which contains the fuel pump is prevented, but a feed flow of fuel to that reservoir from the respective other reservoir is possible.

It is also preferable for the fuel filter to be provided between the cover closure and a reservoir, preferably the second reservoir. The return from the fuel filter, which is by way of a pressure-regulating valve, feeds into the second reservoir. In that way the space between the cover closure and a reservoir is put to optimum use, and the fuel filter or the fuel filter housing and one of the reservoirs are thus arranged in mutual alignment. For example, the pressure-regulating valve which is connected to the fuel filter housing can at least partially project into one of the reservoirs, in the installation configuration of the unit.

Preferably, the fuel filter is accommodated by a filter housing forming a structural unit with the cover closure.

In a preferred feature of the invention the installation holder can be in the form of a telescopic linkage assembly which permits the entire arrangement to be braced against the bottom of a tank, against the force of compression springs provided for that purpose.

Further objects, features and advantages of the invention will be apparent from the description hereinafter of a preferred embodiment thereof.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 6 shows a plan view of the fuel delivery unit;

FIG. 7 shows a view from below of the fuel delivery unit;

FIG. 8 is a side view on an enlarged scale of the sliding guides of the reservoirs;

FIG. 9 is a view in section taken along line IX—IX in FIG. 8,

FIG. 10 is a view in section taken along line X—X in FIG. 9;

FIG. 11 is a view in section taken along line XI—XI in FIG. 10;

DETAILED DESCRIPTION OF THE INVENTION

Figure 1:
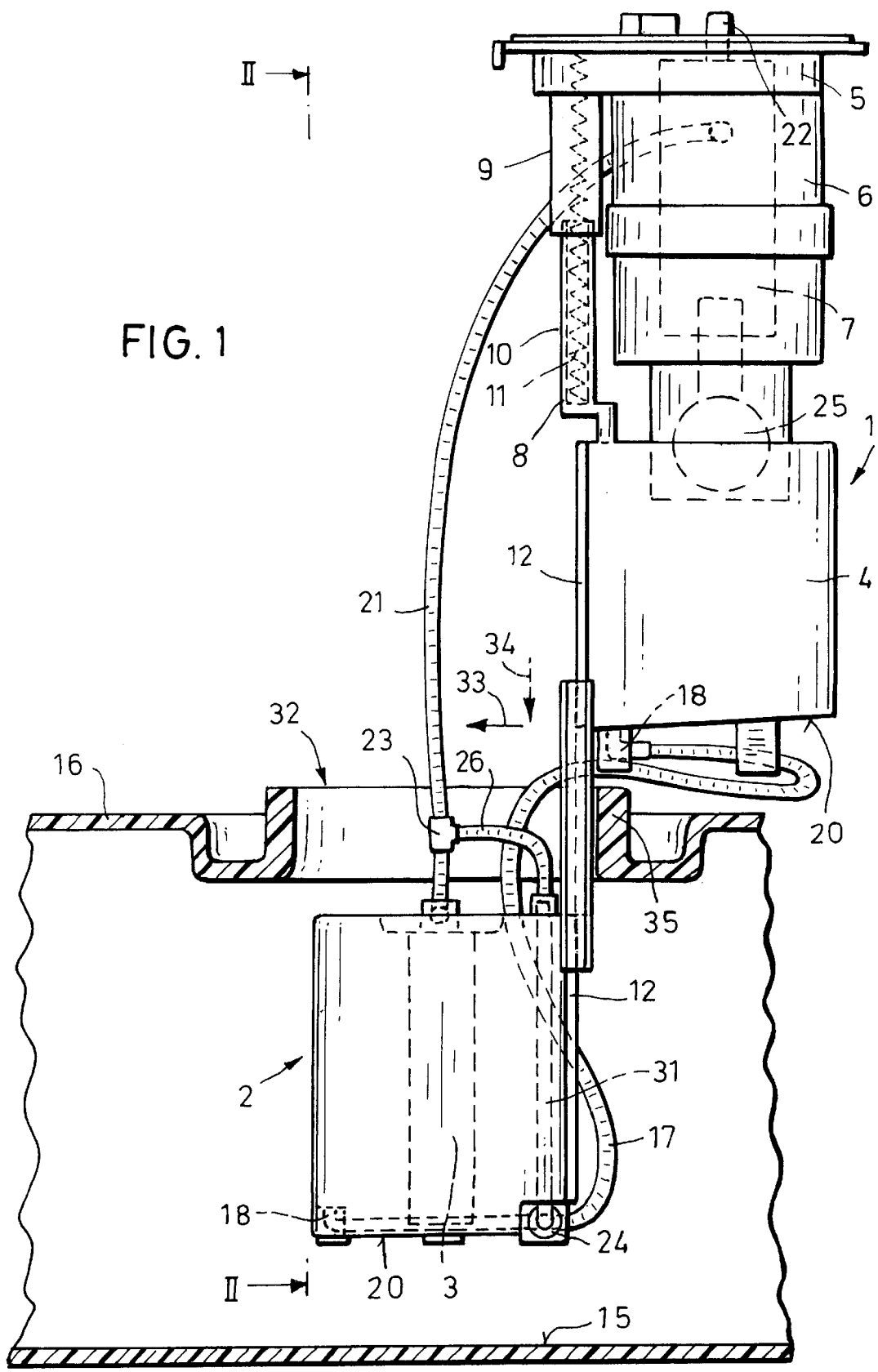
FIG. 1 is a diagrammatic view of a fuel delivery unit according to the invention in its fitting configuration, partly inserted into a fuel tank which is shown in section.
Figure 2:
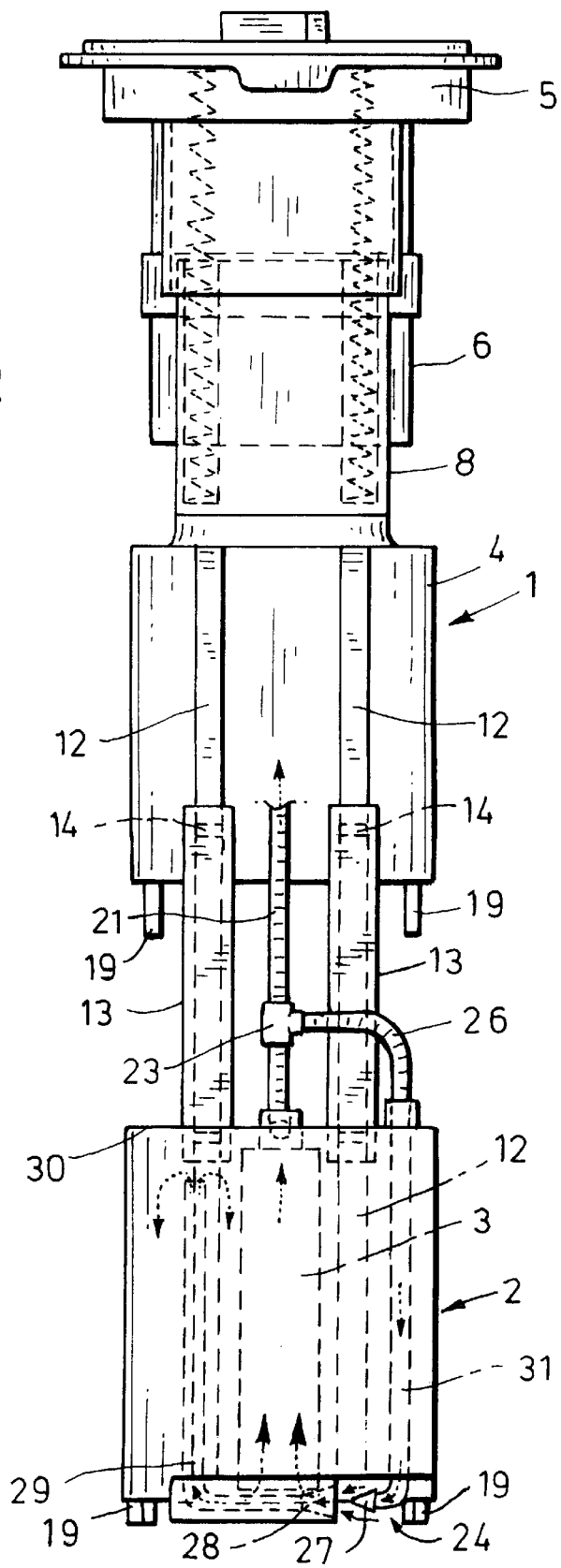
FIG. 2 is a view from the left-hand side in FIG. 1 of the fuel delivery unit shown in FIG. 1 in the fitting configuration thereof.

Referring firstly to FIGS. 1 and 2, shown therein is a fuel delivery unit 1 for use in a fuel tank such as the fuel tank of a motor vehicle, including a first reservoir 2 with a fuel pump 3 arranged therein, a second reservoir 4, a cover closure 5 and a fuel filter housing 6 which is arranged on the underside of the cover closure 5 and which has a fuel filter indicated at 7 arranged therein. The cover closure 5 and the second reservoir 4 are resiliently telescopically connected together by way of an installation holder which is generally indicated at 8. In the illustrated embodiment the installation holder 8 comprises two tubular mountings 9 which are provided at a spacing from each other and which extend downwardly in FIGS. 1 and 2 from the underside of the cover closure 5, and two tubes 10 which are preferably integrally connected to the second reservoir 4 at the upper end thereof and which are telescopically movably received in the tubular mountings 9. The tubes 10 are of a slightly smaller diameter than the tubular mountings 9. The telescopic tubes 10 and the tubular mountings 9 are supported relative to each other by compression springs 11 which pass therethrough. Extension of the telescopic tubes 10 out of the tubular mountings 9 is limited in any suitable manner, for example by means of an appropriate abutment.

Figure 4:
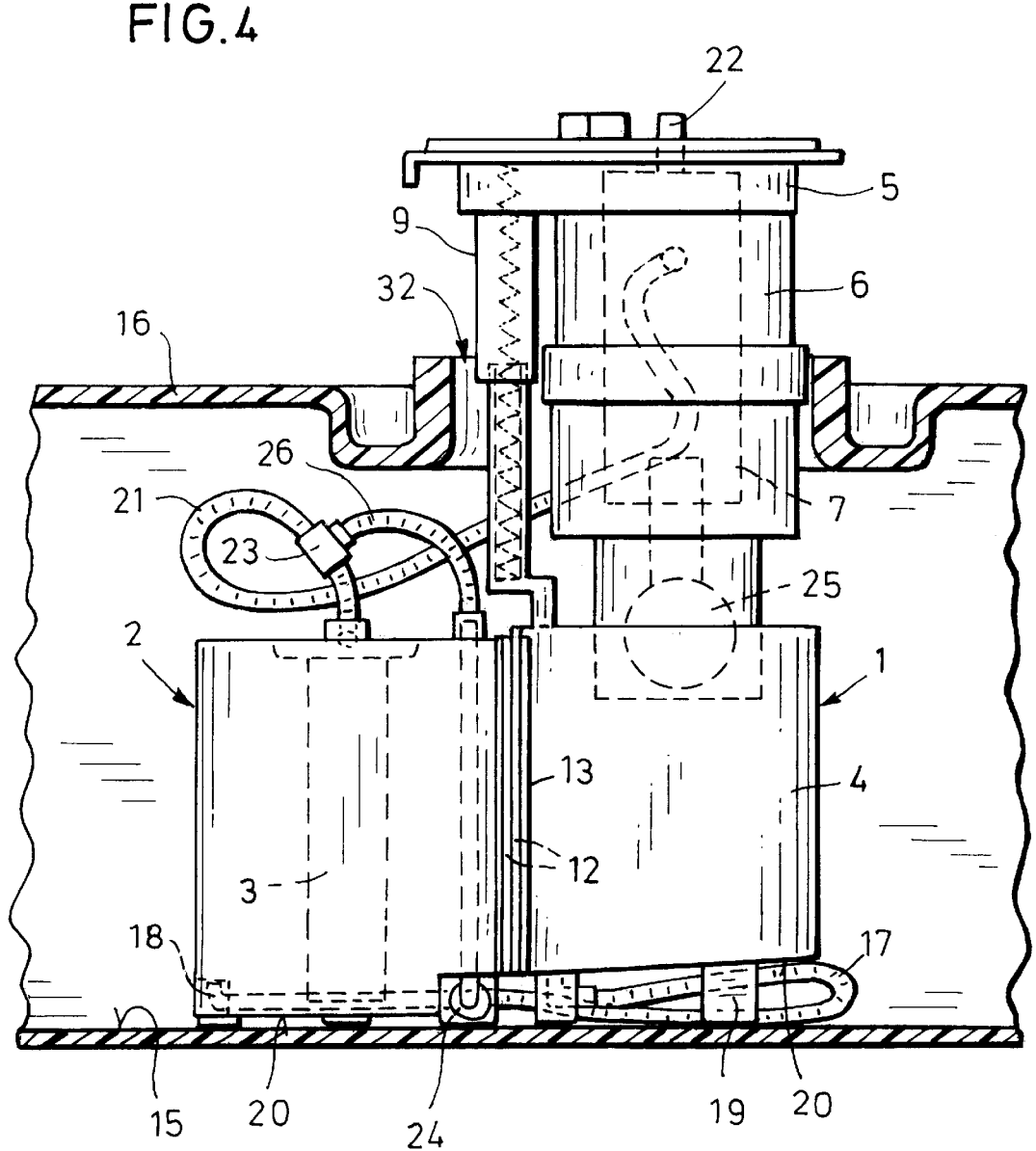
FIG. 4 is a view showing the fuel delivery unit disposed in the tank in its installation configuration but not yet definitively fixed in the tank.
Figure 5:
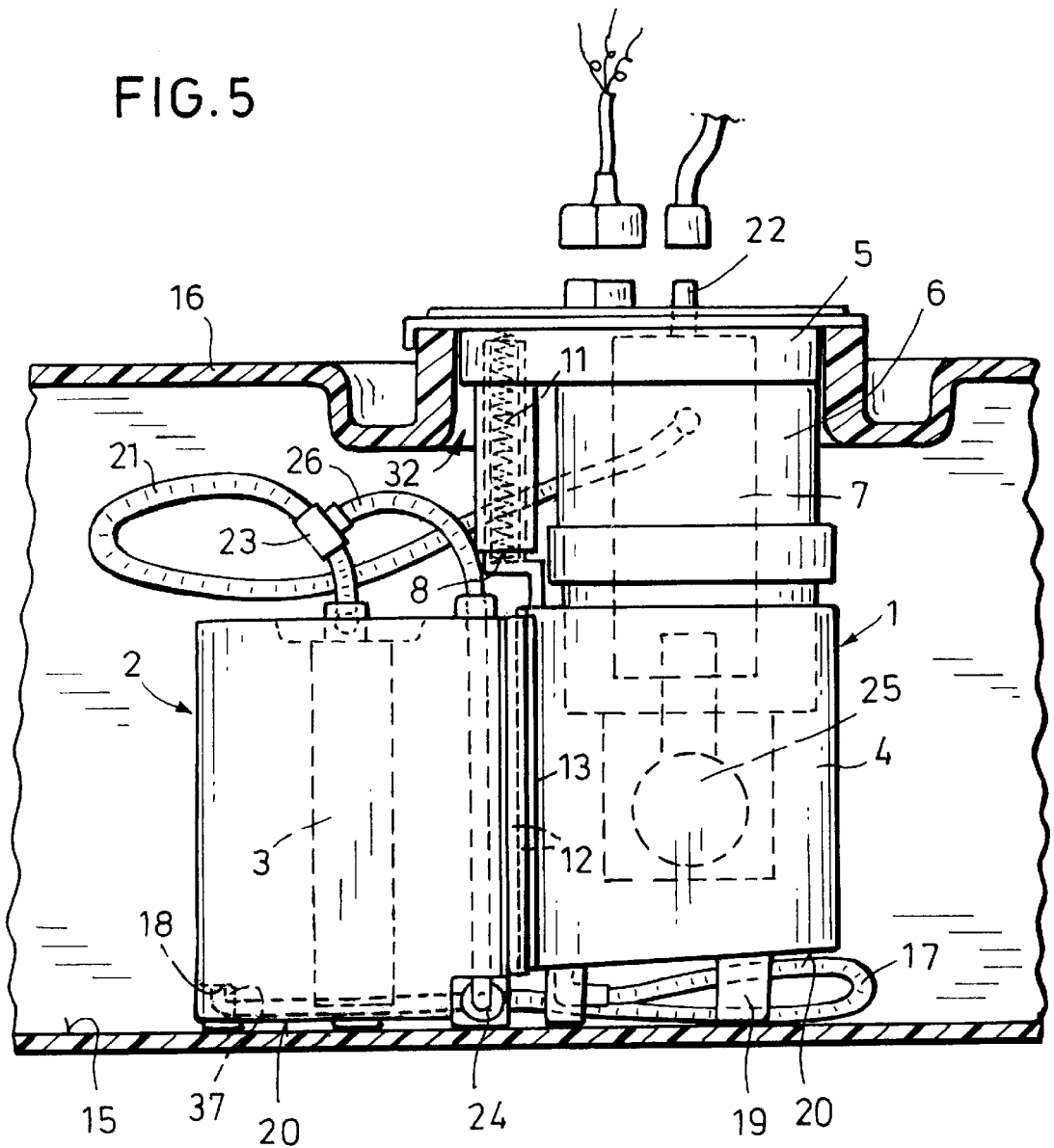
FIG. 5 shows the fuel delivery unit in the condition of being finally fitted and fixed in the tank.

The side of the second reservoir 4 which faces towards the first reservoir 2 is provided therein with two sliding guides 12 in the form of C-profile grooves in which extension portions diagrammatically indicated at 13 in FIG. 2 in the form of I-profile rails are slidably arranged. Likewise, provided on the side of the first reservoir 2 which is towards the second reservoir 4, or at the periphery of the first reservoir 2, are corresponding sliding guides 12 which are also in the form of C-profile grooves and in which the extension portions 13 are also slidably arranged. The sliding guides 12 embrace the flanges of the I-profile shapes of the extension portions 13 in positively locking relationship in each case. Reference numeral 14 in FIG. 2 indicates end abutments which are provided in the sliding guides 12 and also at both sides of the extension portions 13 and which on the one hand limit the extension length of the extension portions 13 and on the other hand, in the installation configuration of the fuel delivery unit 1 as shown in FIGS. 4 and 5, ensure that the first reservoir 2 is urged against the bottom 15 of the tank indicated at 16 by way of the compression springs 11 of the installation holder 8.

In the case of the structure of the fuel delivery unit 1 which is described in the specific embodiment herein, the reservoirs 2 and 4 are connected to the installation holder 8 as a result of being directly connected to each other by way of the extension portions 13 which further comprise the installation holder 8. It will, however, be appreciated that the invention can also be carried into effect in such a way that the installation holder 8 for example can engage under the second reservoir 4, in which case then the extension portions 13 would be guided in the sliding guides 12 of the installation holder 8.

The reservoirs 2 and 4 are each connected together at their bottoms by way of a respective communicating conduit 17. The connection nipples provided for that purpose as indicated at 18 on each of the reservoirs 2 and 4 are so arranged relative to each other that, upon transverse inclination of the tank 16, fuel can flow from the second reservoir 4 into the first reservoir 2, but a discharge flow of fuel from the first reservoir 2 into the second reservoir 4 is prevented when the tank is transversely inclined and/or is subjected to acceleration forces caused by acceleration of the vehicle, if the filling level in the reservoirs 2 and 4 is low. As can be seen more particularly from the view of the fuel delivery unit from below in FIG. 7, that is achieved by virtue of the fact that the connection nipple 18 of the first reservoir 2 is arranged on the bottom thereof on the side remote from the second reservoir 4 while the connection nipple 18 of the second reservoir 4 is arranged thereon at its bottom on the side which is towards the first reservoir 2. As can be seen from the views in FIGS. 7 and 8 on to the fuel delivery unit, the reservoirs 2, 4 as well as the cover closure 5 and the fuel filter housing 6 are in other respects of a round configuration, although it will be appreciated that this is not necessarily the case.

Furthermore, as can be seen more particularly from the view from below in FIG. 7, the communicating conduit 17 is arranged to extend substantially within the projected area of the reservoirs 2 and 4. The reservoirs 2 and 4 are each provided at their bottoms with feet which are indicated at 19 in for example FIGS. 2 and 4 and which rest on the bottom 15 of the tank in the installation position of the fuel delivery unit and thereby define the distance of the bottoms 20 of the reservoirs 2 and 4 from the bottom 15 of the tank 16. The spacing of the bottom 20 of the first reservoir 2 from the bottom 15 of the tank 16 is in that case markedly smaller than the spacing of the bottom 20 of the second reservoir 4 from the bottom 15 of the tank 16, as can be clearly seen for example from FIG. 4. The intermediate space which is formed between the bottom 20 of the second reservoir 4 and the bottom 15 of the tank 16 accommodates the communicating conduit 17 in the installation position of the fuel delivery unit, as can be seen for example from FIG. 5, more particularly in such a way that the communicating conduit 17 still has room for movement beneath the bottom 20 of the second reservoir 4.

Provided in the bottom 20 of the first reservoir 2 is a step which is indicated at 37 in for example FIGS. 5 and 7 and which over a part of the periphery of the reservoir 2 forms a recess for a portion of the communicating conduit 17 so that the connection nipple 18 is arranged at a higher level than the bottom 20 of the first reservoir 2, thereby ensuring in any case that, if the tank 16 is correspondingly transversely inclined or when comparable acceleration forces act on the tank 16, with a low level of fuel in the reservoirs 2 and 4, fuel cannot flow back from the first reservoir 2 into the second reservoir 4. Finally, to facilitate a flow of fuel from the second reservoir 4 into the first reservoir 2, the bottom 20 of the second reservoir 4 is inclined in a direction towards the first reservoir 2.

In regard to the mode of operation of the fuel delivery unit 1 it should be noted that the fuel pump which is denoted by reference numeral 3 and which is arranged in the first reservoir 2 delivers fuel by way of a delivery conduit 21 into the fuel filter housing 6 where the fuel flows through the fuel filter 7 disposed therein and is passed by way of a pressure connection 22 to a fuel feed (not shown) to the engine of a motor vehicle. The fuel filter 7 is in the form of a filter cartridge which is known per se and the design configuration of which therefore does not need to be discussed in greater detail herein. The fuel pump 3 at any event delivers a larger volume flow than is required by the engine of the motor vehicle. In that situation, a part of the volume flow is fed by way of a branch 23 to a suction jet pump which is diagrammatically indicated at 24 and a further part of the volume flow is passed into the second reservoir 4 by way of a pressure-regulating valve 25. The pressure-regulating valve 25 is connected directly to the underside of the fuel filter housing 6 and in the installation configuration of the fuel delivery unit at least partly extends into the second reservoir 4 into which the pressure-regulating valve 25 directly opens.

A conduit which is generally identified by reference numeral 26 in for example FIG. 1 is connected to the branch 23 of the delivery conduit 21 and leads to the suction jet pump 24. The partial flow of the fuel which is branched off the main delivery flow of fuel to the suction jet pump 24 generates in the pump 24 a drive jet which in turn induces a suction jet in the fuel disposed in the tank 16 in a fashion which is known in relation to such a pump configuration.

As can be seen in particular from joint consideration of FIGS. 1 and 2, the propulsion nozzle 27 of the suction jet pump 24 is arranged directly below the bottom of the first reservoir and is directed on to a catch or receiving nozzle 28 which is also provided there and which is disposed in opposite relationship to the propulsion nozzle 27. The catch nozzle 28 communicates with a riser pipe which is indicated at 29 in FIG. 2 and which goes from below the bottom 20 to just beneath the upper edge 30 of the first reservoir and terminates there so that, during operation and in particular when the pump is stopped, this arrangement permanently ensures that the reservoirs 2 and 4 are completely filled.

For reasons of space, the conduit 26 is connected to a passage 31 which passes substantially vertically through the first reservoir 2 and to the lower end of which the propulsion nozzle 27 is connected. It will be appreciated that the propulsion nozzle 27 is disposed at the lowest point in the tank 16.

Installation of the fuel delivery unit 1 will now be discussed.

Figure 3:
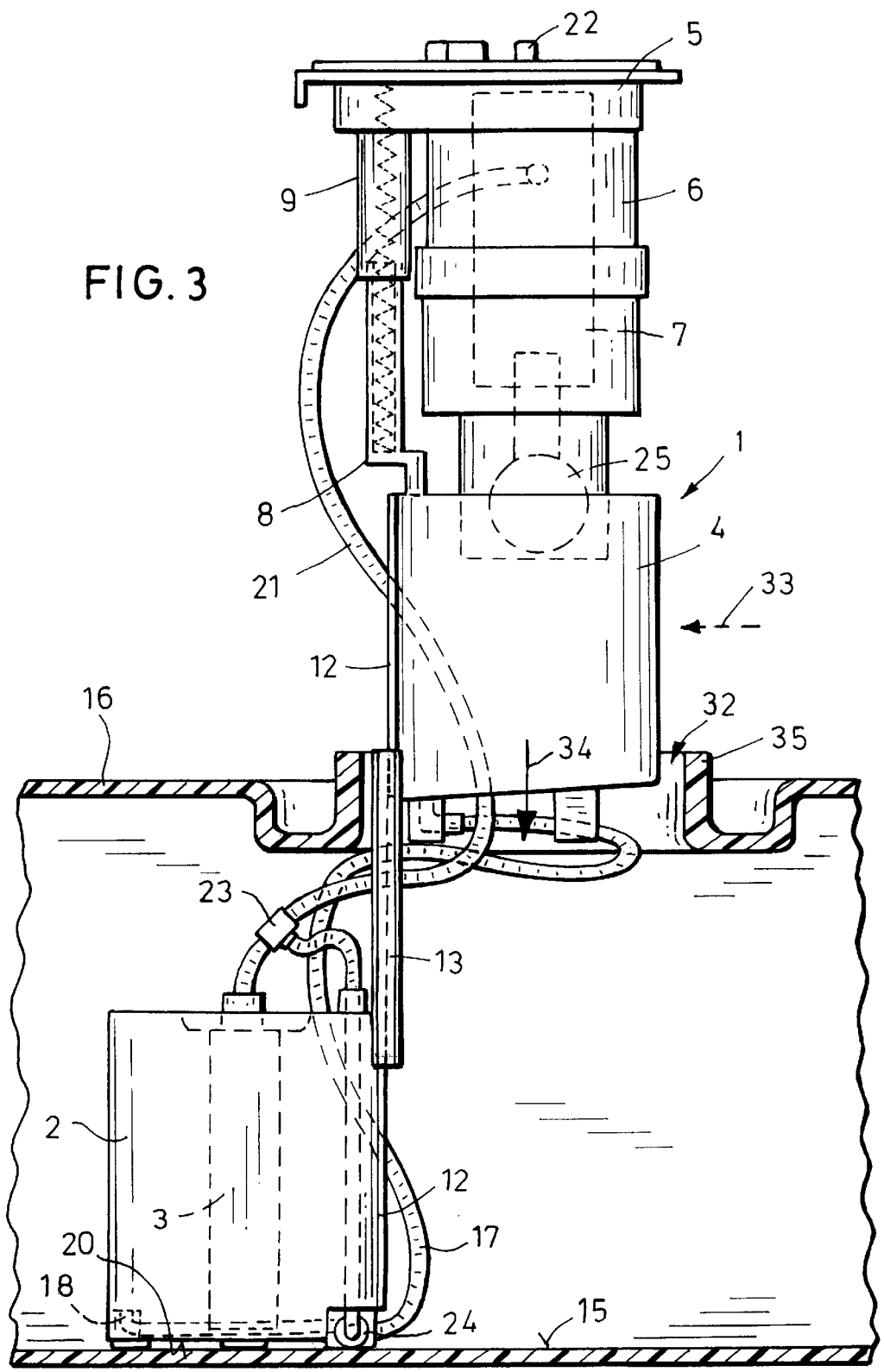
FIG. 3 is a view generally corresponding to FIG. 1 showing the fuel delivery unit in its fitting configuration, wherein one reservoir of the fuel delivery unit has already been displaced into its final position in the tank.

Looking at FIG. 1, shown therein is the fuel delivery unit 1 in the fitting condition, that is to say, in the condition in which it is extended by virtue of the first and second reservoirs being slid away from each other along the sliding guides on the extension portions 13. The first reservoir 2 is thus axially displaced in relation to the second reservoir 4, more particularly by the maximum extension length of the extension portions 13 which thus serve as guide rails. The delivery conduit 21 and the communicating conduit 17 are for that purpose extended into a stretched or almost straight position. The first reservoir 2 has already been introduced into the tank 16 through the fitting opening indicated at 32 in the tank 16. It will be readily apparent from FIG. 1 that the length of the extension portions 13 is such that, with the components in their illustrated positions, it is possible for the entire fuel delivery unit to be displaced in the direction indicated by the arrow 33 within the fitting opening 32, making use of the internal width thereof, more specifically in such a way that the bottom 20 of the first reservoir 4 and the connection nipple 18 disposed therebeneath and the feet 19 do not strike against the collar 35 surrounding the fitting opening 32 on the outside of the tank 16. In that way, the fuel delivery unit 1 can be moved into the position shown in FIG. 3, with a simultaneous downward movement in the direction indicated by the arrow 34. In that position, the first reservoir 2 is standing with its feet 19 on the bottom 15 of the tank 16. The entire arrangement can now be pushed together, in which case the second reservoir 4 with the fuel filter housing 6 arranged thereabove and the cover closure 5 can be introduced into the fitting opening 32. It will be appreciated that, for that purpose, the fuel filter housing 6 and the second reservoir 4 must be arranged beneath the projected area of the cover closure 5. The fuel delivery unit 9 is now telescopically moved together, in which case the extension portions 13 on the two reservoirs 2 and 4 move completely into the sliding guides 12 provided thereon until the fuel delivery unit has assumed the position shown in FIG. 4, with the feet 19 of the second reservoir 4 now also standing on the bottom 15 of the tank 16. The end abutments which are provided on both sides of the extension portions 13 and the sliding guides 12 now come into effect in that position. The upper end abutment 14 co-operates with the sliding guides 12 of the second reservoir 4 and the respective lower end abutment 14 on the extension portions 13 co-operates with the sliding guides 12 of the first reservoir 2, more specifically in such a way that, when the fuel delivery unit is pushed together into the position of being braced against the bottom 15 of the tank 16, as shown in FIG. 5, the compression springs 11 of the installation holder 8 act by way of the second reservoir 4 on the first reservoir 2 so that the latter is also securely braced against the bottom 15 of the tank 16 and vertical displacement thereof is prevented.

It will he noted that reference numeral 36 shown in FIGS. 6 and 7 denotes a filling level pick-up which is connected to the first reservoir 2 and acts on switching elements disposed therein.

It will be noted from the foregoing description that at least one reservoir 2, 4 at least in the installation configuration is arranged in the tank at least partly outside the projected area of the cover closure 5.

Figure 12:
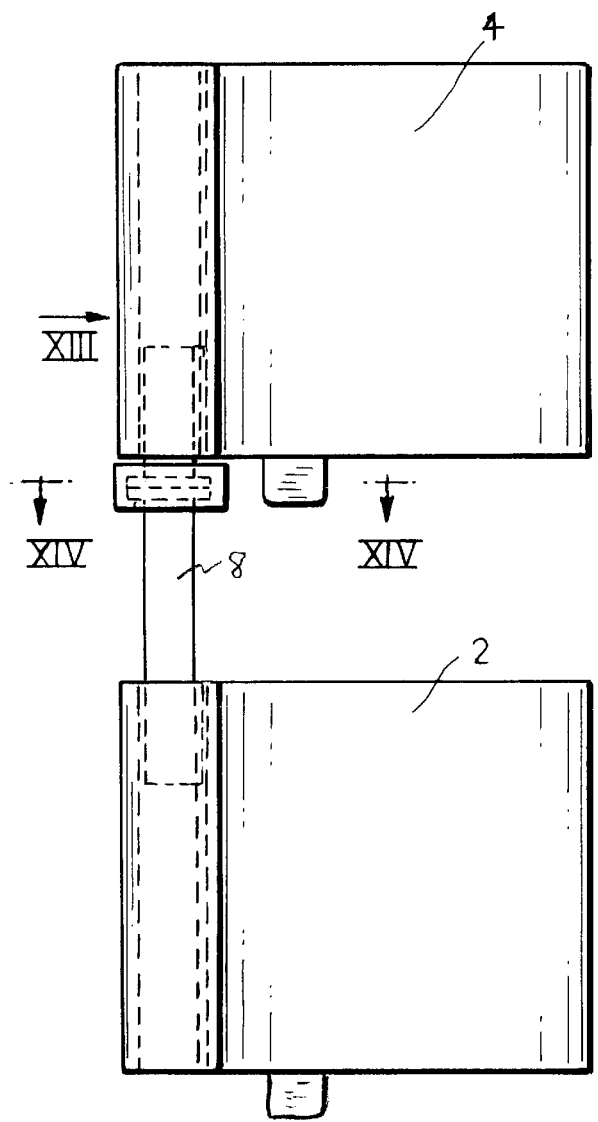
FIG. 12 is a diagrammatic partial front view of an alternative fuel delivery unit, including reservoirs arranged to be pivotable with respect to each other.
Figure 13:
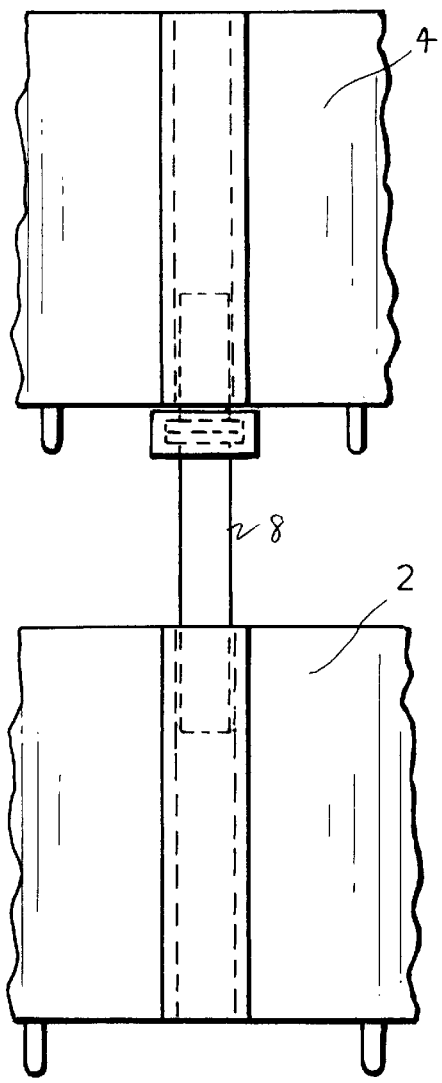
FIG. 13 is a left-hand side view of the reservoir arrangement taken along line XIII—XIII in FIG. 12.
Figure 14:
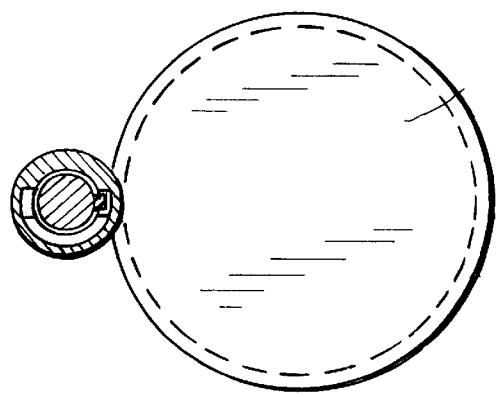
FIG. 14 is a partial sectional view of the reservoir arrangement taken along line XIV—XIV in FIG. 12.
Figure 15:
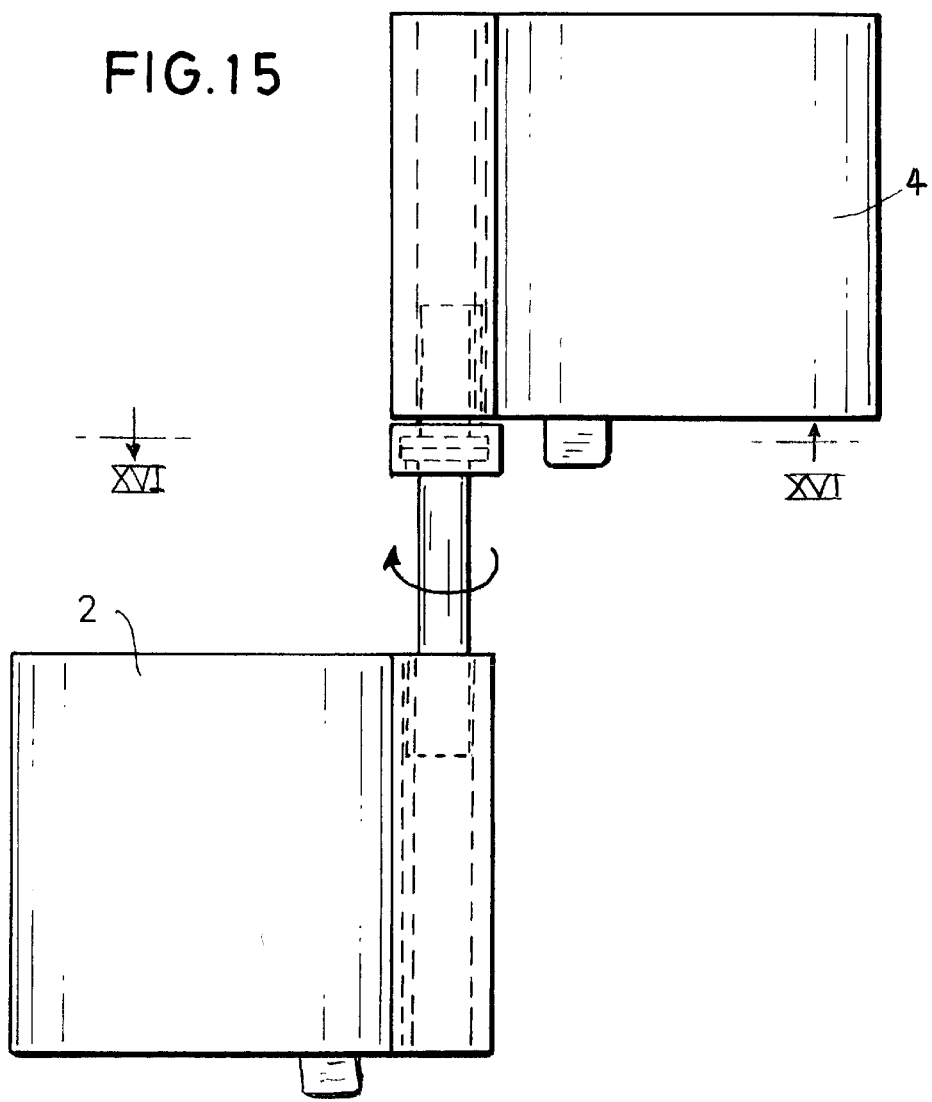
FIG. 15 is a front view of the reservoir arrangement of FIG. 12 illustrating the reservoirs pivotably rotated with respect to each other.
Figure 16:
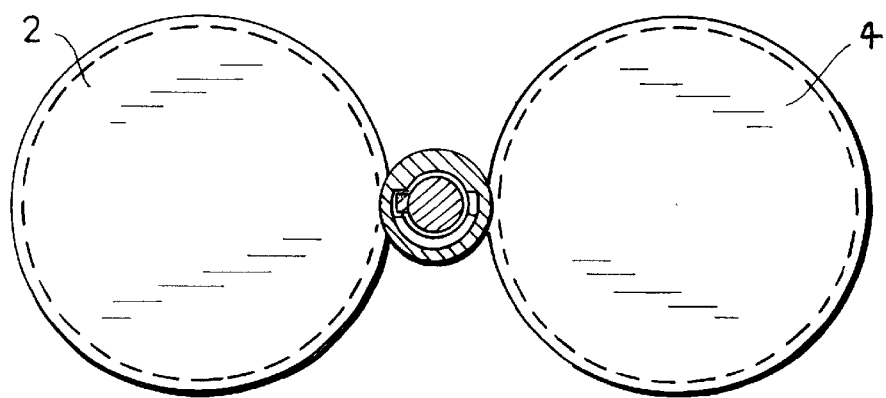
FIG. 16 is a partial sectional view of the rotated reservoir arrangement taken along line XVI—XVI in FIG. 15.

In a modification, as shown, for example, in FIGS. 12 through 16, it will also be noted that the fuel delivery unit can also be so designed such that the reservoirs 2, 4 can be arranged to be pivotable relative to each other on an installation holder 8. As shown in FIGS. 12 through 14, in the fitting configuration, both reservoirs are arranged in an axially successive and mutually aligned relationship. However, while in the installation configuration, as shown in FIGS. 15 and 16, one of the reservoirs, preferably the lowermost reservoir 2, is adapted to be pivotable and axially displaceable at least with respect to the installation holder. As shown, for example, by the arrow in FIG. 15, the pivotal movement of the lowermost reservoir 2 is then effected by way of a torque applied in the fitting operation to the holder. The torque can be applied either by means of a wrench which is provided for that purpose or by way of a projection provided for that purpose on the bottom of the tank as a contact portion for initiating the pivotal movement. Alternatively it is possible for the components to be arranged in mutually aligned relationship in the fitting configuration under a spring biasing force. In that case, displacement into the installation configuration can be effected by actuating a release mechanism so that the components then move into their installation configuration by virtue of the spring force acting thereon. It will be appreciated that in that respect additional means will be provided to fix the reservoirs in the installation position in relation to each other. The upper reservoir 4 and the cover closure and possibly a filter housing can then be moved into the final assembled condition of the unit by pushing it together with a telescopic motion.

It will further be appreciated that while the above-described specific embodiment uses compression springs for bracing the arrangement in relation to the bottom 15 of the tank 16 these are representative of suitable bracing means which alternatively for example may comprise flexible damping elements achieving the same aim.

It will be appreciated that the above-described structure in accordance with the invention has been set forth solely by way of example and illustration of the principles of the invention and that various other modifications and alterations may be made therein without thereby departing from the spirit and scope of the invention.

I claim:

1. A fuel delivery unit including
an installation holder,
bracing means on the installation holder for bracing the unit in relation to the bottom of a tank in which the fuel delivery unit is to be fitted,
at least one first reservoir on the installation holder,
a fuel pump in the first reservoir,
a cover closure for a fitting opening in the fuel tank,
a second reservoir on the installation holder,
communication means providing a flow communication of the first and second reservoirs with each other, and
support means mounting the first and second reservoirs to the installation holder in movable relationship at least between a fitting configuration for fitting the unit through said fitting opening into the fuel tank and an installation configuration in which the unit is installed within the tank while retaining the axial orientation, the second reservoir in the installation position being beside the first reservoir,
at least one reservoir being arranged when in the tank at least in the installation configuration at least partly outside the projected area of the cover closure.

2. A unit as set forth in claim 1
wherein said support means mount the reservoir to the installation holder in axially slidable relationship.

3. A unit as set forth in claim 1
wherein said support means mount the reservoir to the installation holder in pivotable relationship.

4. A unit as set forth in claim 1 and further including
means guiding a reservoir longitudinally displaceably on the installation holder in such a way that the spacing thereof relative to the cover closure is variable for fitting into the tank.

5. A unit as set forth in claim 1 and including
means guiding a reservoir longitudinally displaceably on the other reservoir in such a way that the spacing thereof relative to the cover closure is variable for fitting into the tank.

6. A unit as set forth in claim 4
wherein said reservoir is the first reservoir.

7. A unit as set forth in claim 5
wherein said reservoir is the first reservoir.

8. A unit as set forth in claim 1
wherein the second reservoir is arranged within the projected area of the cover closure.

9. A unit as set forth in claim 4
wherein the means longitudinally displaceably guiding a reservoir comprises at least one extendible extension portion whose extension length is such that the reservoir which is fitted first into the fitting opening of the tank is displaceable in the tank substantially transversely to the direction of introduction in its installation position, making use of the internal width of said fitting opening in the tank.

10. A unit as set forth in claim 5
wherein the means longitudinally displaceably guiding a reservoir comprises at least one extendible extension portion whose extension length is such that the reservoir which is fitted first into the fitting opening of the tank is displaceable in the tank substantially transversely to the direction of introduction in its installation position, making use of the internal width of said fitting opening in the tank.

11. A unit as set forth in claim 9 and including
at least two said extension portions.

12. A unit as set forth in claim 10 and including at least two said extension portions.

13. A unit as set forth in claim 9
wherein the reservoirs have sliding guides and wherein said extension portions are guide rails provided with end abutments and longitudinally slidably and non-rotatably accommodated by the sliding guides of the reservoirs.

14. A unit as set forth in claim 10 wherein said first reservoir and said installation holder have sliding guides, and wherein said extension portions are guide rails provided with end abutments and longitudinally slidably and non-rotatably accommodated by the sliding guides of the first reservoir and the installation holder.

15. A unit as set forth in claim 13 wherein the guide rails comprise I-profile rails and the sliding guides are in the form of C-profile grooves which embrace the flanges of the I-profile rails in positively locking relationship therewith.

16. A unit as set forth in claim 14 wherein the guide rails comprise I-profile rails and the sliding guides are in the form of C-profile grooves which embrace the flanges of the I-profile rails in positively locking relationship therewith.

17. A unit as set forth in claim 1 wherein the communication means include a flexible conduit connecting the reservoirs together at their bottoms on the basis of the principle of communicating vessels.

18. A unit as set forth in claim 17 wherein the conduit is arranged to extend substantially below same and in such a way that in the condition in which they are moved away from each other in the fitting configuration thereof said conduit projects at least scarcely out of the projected area thereof.

19. A unit as set forth in claim 17 wherein the reservoirs include connection portions connecting to said conduit and so positioned relative to each other that upon inclination of the tank and with a low fuel level in the reservoirs discharge of fuel from the reservoir which contains the fuel pump is prevented but a feed flow of fuel to said reservoir from the respective other reservoir is possible.

20. A unit as set forth in claim 19 wherein the connection of the first reservoir to the conduit is arranged at same on the bottom on the side remote from the second reservoir and the connection of the second reservoir to the conduit is arranged at same on the bottom on the side towards the first reservoir.

21. A unit as set forth in claim 1 including a fuel filter between the cover closure and a reservoir.

22. A unit as set forth in claim 21 wherein said reservoir is the second reservoir.

23. A unit as set forth in claim 21 and further including a pressure-regulating valve having a return from the fuel filter and means communicating said return to the reservoir disposed beneath the cover closure.

24. A unit as set forth in claim 21 including a filter housing accommodating the fuel filter and forming a structural unit with the cover closure.

25. A unit as set forth in claim 1 wherein the installation holder is in the form of a telescopic assembly which permits bracing of the unit on the bottom of a tank against the action of compression springs.

26. A fuel delivery unit for fitting in a fuel tank, including a first reservoir, a fuel pump in the first reservoir, a second reservoir, a cover closure on the second reservoir for closing a fitting opening in the fuel tank after the unit has been introduced thereinto, means for a fuel flow communication of the first and second reservoirs with each other, an installation holder, means mounting the first and second reservoirs to the installation holder displaceably relative to each other between a fitting configuration for introducing the unit into the fuel tank through the fitting opening and an installation configuration, while retaining the axial orientation of the unit, and means operable to brace the unit in its installed position in the tank, wherein at least one reservoir is arranged in the tank at least in the installation configuration at least partly outside the projected area of the cover closure.

* * * * *